May 7, 1929.  W. O. SNELLING  1,711,974
CURRENT RECTIFYING DEVICE
Filed Feb. 10, 1927
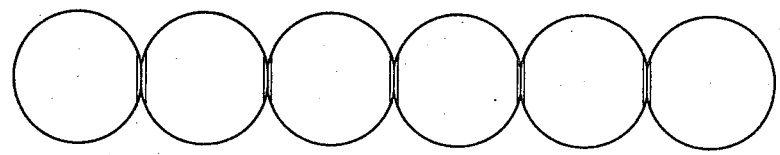
Fig. 1
Fig. 2
Fig. 3
     
Fig. 4           Fig. 5
Fig. 6
Fig. 7
Walter O. Snelling.
Inventor Patented May 7, 1929.

1,711,974

UNITED STATES PATENT OFFICE.

WALTER O. SNELLING, OF ALLENTOWN, PENNSYLVANIA.

CURRENT-RECTIFYING DEVICE.

Application filed February 10, 1927. Serial No. 167,118.

My invention relates to improvements in current rectifying devices, and more particularly relates to improvements in the preparation of contact rectifying products. One of the objects of my invention is to provide improved means for the rapid and inexpensive manufacture of contact rectifying elements suitable for use in the rectification of alternating current for battery charging purposes and for like uses where it is desired to obtain unidirectional current from an alternating current supply.

In my U. S. Patent 1,565,595 I have broadly described and claimed the preparation of contact rectifying products by the reaction between a metal and an element of the sulfur group at a temperature above the reaction temperature of the two materials but below the temperature of fusion of the reaction product formed. My present invention is a further development of my earlier process, and its principal object is to enable contact rectifying elements to be economically made in any desired form. Another object is to prepare current rectifying elements possessing certain physical characteristics as will be described and which have been found desirable in the economical fabrication of current rectifying devices for battery charging and other like purposes.

The current rectifying elements made in accordance with the process described in my U. S. Patent 1,565,595, possess high current rectifying ability, and relatively small contact rectifying elements may conveniently be used in the construction of apparatus of relatively large capacity. It has been found desirable, however, to use a plurality of small contact rectifying elements in preference to a smaller number of relatively larger rectifying elements, as thereby greater rectifying effect is obtained, and one of the objects of my present invention is to provide methods by which relatively small contact rectifying elements of predetermined size and of improved nature may be made commercially at low cost.

In the drawings forming part of this application, Fig. 1 is a plan view of a strip of metal for use in the preparation of contact rectifying elements in accordance with my present invention, and Fig. 2 is a cross-sectional view through the strip of metal shown in Fig. 1. Fig. 3 is a cross-sectional view of the metal blank shown in plan in Fig. 1 and in section in Fig. 2, after partial conversion of the metal to its reaction product has occurred in the manner that will be herein described. Fig. 4 is a sectional view of one of the portions of the blank shown in Fig. 3, after being separated from the remainder of the composite. Fig. 5 is a sectional view of a corresponding portion of the blank shown in Fig. 7, after being separated from the remainder of the composite. Fig. 6 represents two blanks such as shown in Fig. 2, with one of the surfaces of each blank in contact, and Fig. 7 represents one of the blanks shown in Fig. 6, after the metal has been partially but not completely transformed into its reaction product with the vapor of an element of the sulfur group.

I have found that a notable change in volume occurs when a metal reacts with an element of the sulfur group at a temperature below the fusion point of the reaction product formed, the reaction product having a materially greater volume than the initial volume of the metal before reaction. By forming a "blank" of metal of the shape desired for the completed contact rectifying element, but relatively smaller than the desired final product by an amount proportional to the cubical expansion which occurs upon reaction, it is readily possible to prepare contact rectifying elements directly by reaction between a metal and an element of the sulfur group, without the troublesome shaping of the final reaction product that would otherwise be necessary.

In one form of my present invention I cut from a suitable strip of metal a series of connected blanks, the individual blanks being separated from each other by metal of smaller cross-sectional area than the normal cross-sectional area of the elements themselves. Upon exposing such a strip to the vapor of sulfur at a temperature in excess of the temperature necessary to begin reaction between the two materials, a vigorous reaction with the evolution of considerable heat goes on progressively from the surface inwardly, until the entire mass of material has been transformed into the final reaction product. As a result of the marked change of volume which occurs upon reaction, stresses occur within the product which make the separation of the individual blanks take place with much greater ease and definiteness than would be the case if a composite blank of the same size and shape were prepared by the shaping of a previously formed sheet of the reaction product.

I am of course aware that the preparation of groups of objects with restricted cross-sec tional areas at the boundary between individual portions for the purpose of insuring ready separation is not new, and I do not claim the formation of a blank with restricted cross-sectional area between the individual portions thereof, except in connection with a material which upon reaction with an element of the sulfur group leads to a notable increase in volume, with the resultant production of stresses within the material favoring parting along the lines of demarcation.

In order to fully understand the significance of my present invention it must be remembered that metals in general possess such properties of malleability and toughness as permit of their being readily formed into masses of any desired shape, while the reaction products of such metals with sulfur or other element of the sulfur group are in general highly brittle and are of relatively very low tensile strength. The expansion in volume which occurs upon the transformation of a metal into its reaction product with an element of the sulfur group increases the internal strains within the material, and hitherto has acted to reduce the normally low strength of the reaction product, while by my invention I apply the strains thus produced to enable me to form contact rectifying elements of desired shape, by the sharp breaking along predetermined lines of the individual elements of a composite blank, thus turning an undesirable factor into a desirable one, and materially improving the preparation of contact rectifying elements of the described type.

In the practice of my present invention I have found that by the controlled admission of sulfur vapor to the space within which the blanks of metal are heated, the rate of reaction between the metal and the element of the sulfur group can be controlled to any desirable extent, and by maintaining a temperature higher than the reaction temperature between the metal and sulfur vapor for example, while admitting sulfur vapor very slowly, I find it readily possible to partially convert the metal to its reaction product, while still leaving any desired portion of the metal unconverted.

The application of this principle will be readily understood in the preparation of contact rectifying elements from a blank such as is shown in Fig. 1 and Fig. 2, and by the admission of sulfur vapor at a very slow rate, until approximately half of the amount of sulfur required to fully convert the blank has been added, I find it very simple to obtain contact rectifying elements each of which has an interior reinforcing core of metal, while the metal along the lines of restricted cross-sectional area has been completely converted into the reaction product. In Fig. 3 I have shown a cross-section through the blank shown in Fig. 2, after reaction is nearly complete, and in Fig. 4 is shown one of the individual contact rectifying elements, after being separated from the blank. As a result of the strains which are set up in the blank during reaction as a consequence of the increased volume of the reaction product as compared with the volume of the metal in the original blank, the portions of the blank bounded by the lines of restricted cross sectional area may be separated from each other very readily and without further breakage of the very brittle products, and such ready separation occurs, whether the conversion of the metal to reaction product has been partial or complete.

In certain forms of contact rectifying devices it is desirable to have a disk of copper sulfide, for example, attached to a copper electrode. Up to this time rectifying devices of this sort have been made by the method described in my U. S. Patent 1,565,595, the sheets of copper being caused to react with sulfur vapor at a temperature lower than the fusion point of the reaction product, and the sheet so produced being then cut up into disks, and the disks being mounted on disks of aluminum, tin or other soft metal by the use of pressure. Even with the use of the softest metals obtainable it is difficult, however, to prevent the breakage of a good many of the disks thus mounted, as a consequence of the very brittle nature of the resulting reaction product.

I have discovered that by placing two blanks such as the one shown in Fig. 1 and Fig. 2 with one of the surfaces of each blank in contact with one surface of the other blank and then exposing the double blank thus prepared to reaction with sulfur vapor for example, under controlled conditions of admission of the sulfur vapor, I can directly obtain composite disks having one surface of metal suitable for contact with a normal electrode, while the remaining surface of the product possesses normal contact rectifying properties, this method of preparation forming a great improvement over the methods previously known of forming composite contact rectifying elements.

Instead of placing opposite surfaces of two blanks together it will be evident that one surface of a blank may be coated with a nonreactive material such as plaster of Paris, for example, or other substance that will not react with sulfur vapor at the temperature of reaction employed. After the completion of the reaction the protecting agent may be removed, leaving uncombined metal at the point so protected, while the remainder of the blank has been converted to the contact rectifying product. Instead of a protective coating such as plaster of Paris, one surface of a blank may be held firmly in contact with a sheet of asbestos or other suitable solid material during the reaction step, the protecting sheet being mechanically removed after the reaction with the vaporous reagent has proceeded to the desired extent.

The expansion which occurs when a metal combines with the vapor of an element of the sulfur group at a temperature higher than that necessary to produce reaction but lower than the melting point of the resulting reaction product depends upon the particular metal and the particular vaporous reagent which is used, and is further influenced by the temperature at which the reaction occurs which in turn is influenced by the rate at which the vaporous reagent is admitted to the reaction chamber. I have found it possible, by controlling the temperature of my reaction vessel and the rate at which sulfur vapor for example is admitted to the reaction chamber, to prepare finished detector elements of final size differing materially from the initial size of the blank, but conforming to predetermined final dimensions. The size of a contact rectifying element is of course a matter of but little importance when the element is to be mounted in fusible metal or the like, while unvarying uniformity of size becomes particularly important in the quantity production of rectifying elements for mounting in assemblies of standardized dimensions, and ability to obtain final rectifying elements of exactly predetermined size from metal blanks has proven to be a very important factor in the commercial production of such contact rectifying elements for use as battery chargers and for corresponding uses.

Although in the practice of my present invention I prefer to employ copper as the metal used, and sulfur as the vaporous reagent used, it will be evident that many other materials may be used with substantially equivalent results, lead, bismuth and antimony forming equivalents for copper under definite modifications of my process, and selenium vapor and tellurium vapor forming equivalents for sulfur vapor. In general, however I find sulfur vapor to form the most satisfactory vaporous reagent, and copper to form the most satisfactory metal for use in the forming of my blanks, and except for the preparation of rectifying elements having quite special properties, I prefer to employ these materials in the practice of the invention as herein described.

It will be evident that many changes may be made without departing from the essential principles as herein disclosed, and accordingly no limitations should be placed upon my invention except as indicated in the appended claims.

I claim:

1. The process which comprises forming a metal blank made up of a plurality of parts separated by zones of reduced cross-sectional area, bringing about a reaction between a portion of the metal and the vapor of an element until the metal at the zone of reduced cross-sectional area is completely transformed into a non-metallic product, and separating the units along the lines of minimum cross-sectional area.

2. The process which comprises forming a copper blank made up of a plurality of parts separated by zones of reduced cross-sectional area, bringing about a reaction between the metal and the vapor of an element until the metal at the zone of reduced cross-sectional area is completely transformed into a non-metallic product, and separating the units along the lines of minimum cross-sectional area.

In testimony whereof, I have hereunto subscribed my name this 8th day of February, 1927.

WALTER O. SNELLING.